United States Patent
Kimura et al.

(10) Patent No.: US 10,665,260 B2
(45) Date of Patent: May 26, 2020

(54) OPTICAL DISC RECORDING DEVICE AND OPTICAL DISC RECORDING METHOD

(71) Applicant: Panasonic Intellectual Property Management Co., Ltd., Osaka (JP)

(72) Inventors: Naohiro Kimura, Kyoto (JP); Harumitsu Miyashita, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/260,837

(22) Filed: Jan. 29, 2019

(65) Prior Publication Data

US 2019/0237102 A1    Aug. 1, 2019

(30) Foreign Application Priority Data

Jan. 30, 2018 (JP) ................................ 2018-013414
Jan. 21, 2019 (JP) ................................ 2019-007545

(51) Int. Cl.
| G11B 7/00 | (2006.01) |
| G11B 7/007 | (2006.01) |
| G11B 7/28 | (2006.01) |
| G11B 7/24094 | (2013.01) |

(52) U.S. Cl.
CPC ...... *G11B 7/00736* (2013.01); *G11B 7/24094* (2013.01); *G11B 7/28* (2013.01)

(58) Field of Classification Search
None
See application file for complete search history.

(56) References Cited

U.S. PATENT DOCUMENTS

| 2004/0001413 | A1 | 1/2004 | Suyama | |
| 2004/0071454 | A1 | 4/2004 | Nishizawa | |
| 2005/0195727 | A1* | 9/2005 | Ruden | G11B 5/00 369/124.01 |
| 2006/0018245 | A1* | 1/2006 | Bruekers | G11B 19/00 369/275.1 |
| 2007/0019064 | A1* | 1/2007 | Yamada | B41J 3/4071 347/224 |
| 2007/0187504 | A1* | 8/2007 | Peng | G11B 7/0037 235/454 |

(Continued)

FOREIGN PATENT DOCUMENTS

| JP | 2004-39013 | 2/2004 |
| JP | 2004-39027 | 2/2004 |
| JP | 3846373 | 11/2006 |

*Primary Examiner* — Peter Vincent Agustin
(74) *Attorney, Agent, or Firm* — Wenderoth, Lind & Ponack, L.L.P.

(57) ABSTRACT

An optical disc recording device includes a data acquisition unit configured to acquire bitmap data corresponding to image information, an address information acquisition unit configured to acquire address information set in wobbles of an optical disc by wobble synchronization from the optical disc, a recording position determining unit configured to determine a recording position on the optical disc for recording the bitmap data using the address information, and a mark recording unit configured to form a recording mark corresponding to the bitmap data on the information recording track of the optical disc by applying a light beam having recording power to the recording position on the optical disc.

12 Claims, 13 Drawing Sheets

(56) References Cited

U.S. PATENT DOCUMENTS

| | | | |
|---|---|---|---|
| 2007/0253616 A1* | 11/2007 | Suto | G03F 9/7069 |
| | | | 382/151 |
| 2008/0261809 A1* | 10/2008 | Janssen | G11B 7/0037 |
| | | | 503/206 |
| 2008/0298222 A1* | 12/2008 | Hirose | B82Y 10/00 |
| | | | 369/275.4 |
| 2009/0251525 A1 | 10/2009 | Suyama | |
| 2011/0141608 A1* | 6/2011 | Guzik | G11B 5/00 |
| | | | 360/75 |
| 2012/0027378 A1 | 2/2012 | Nishizawa | |
| 2019/0237102 A1* | 8/2019 | Kimura | G11B 7/00736 |

\* cited by examiner

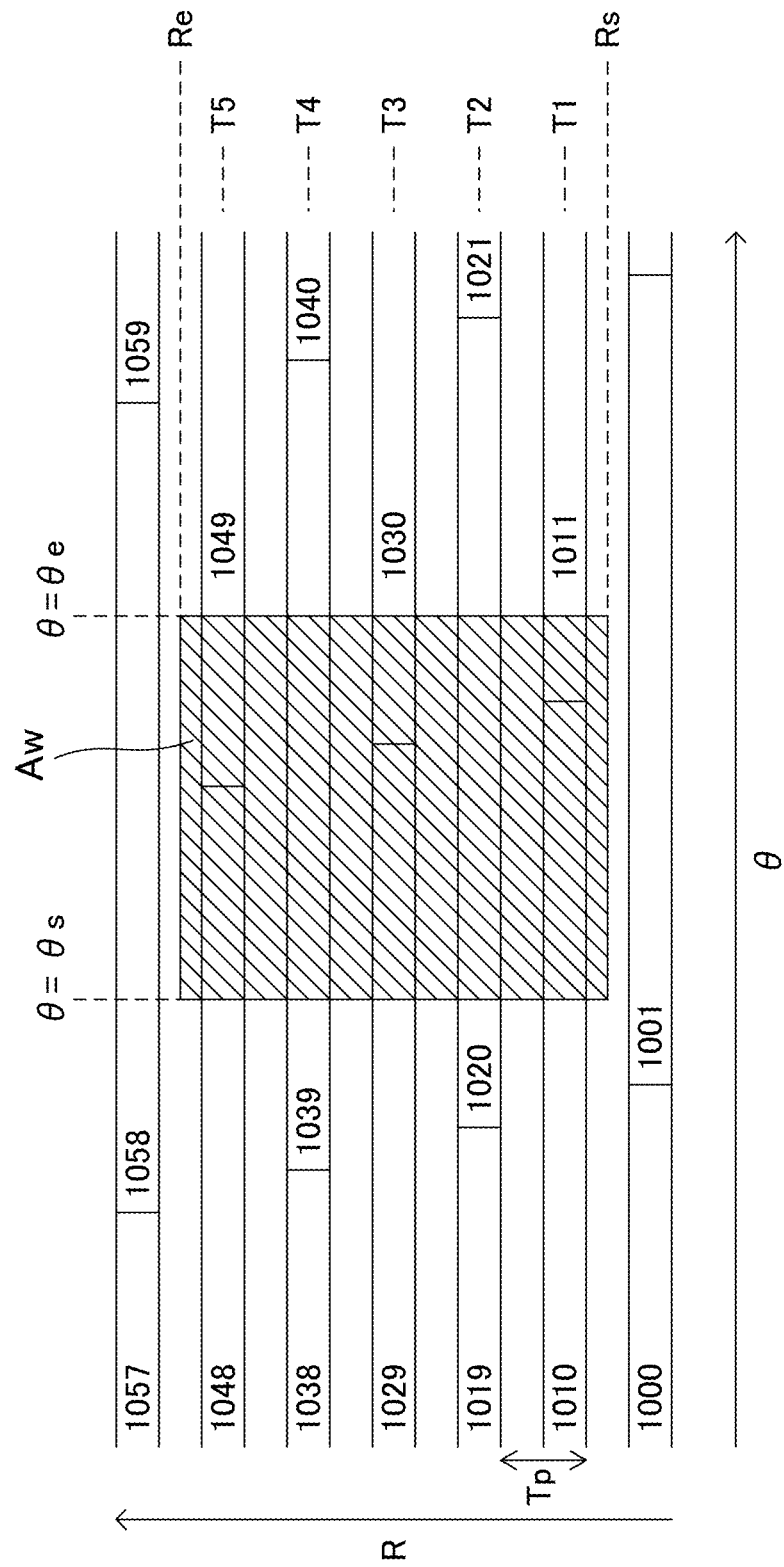

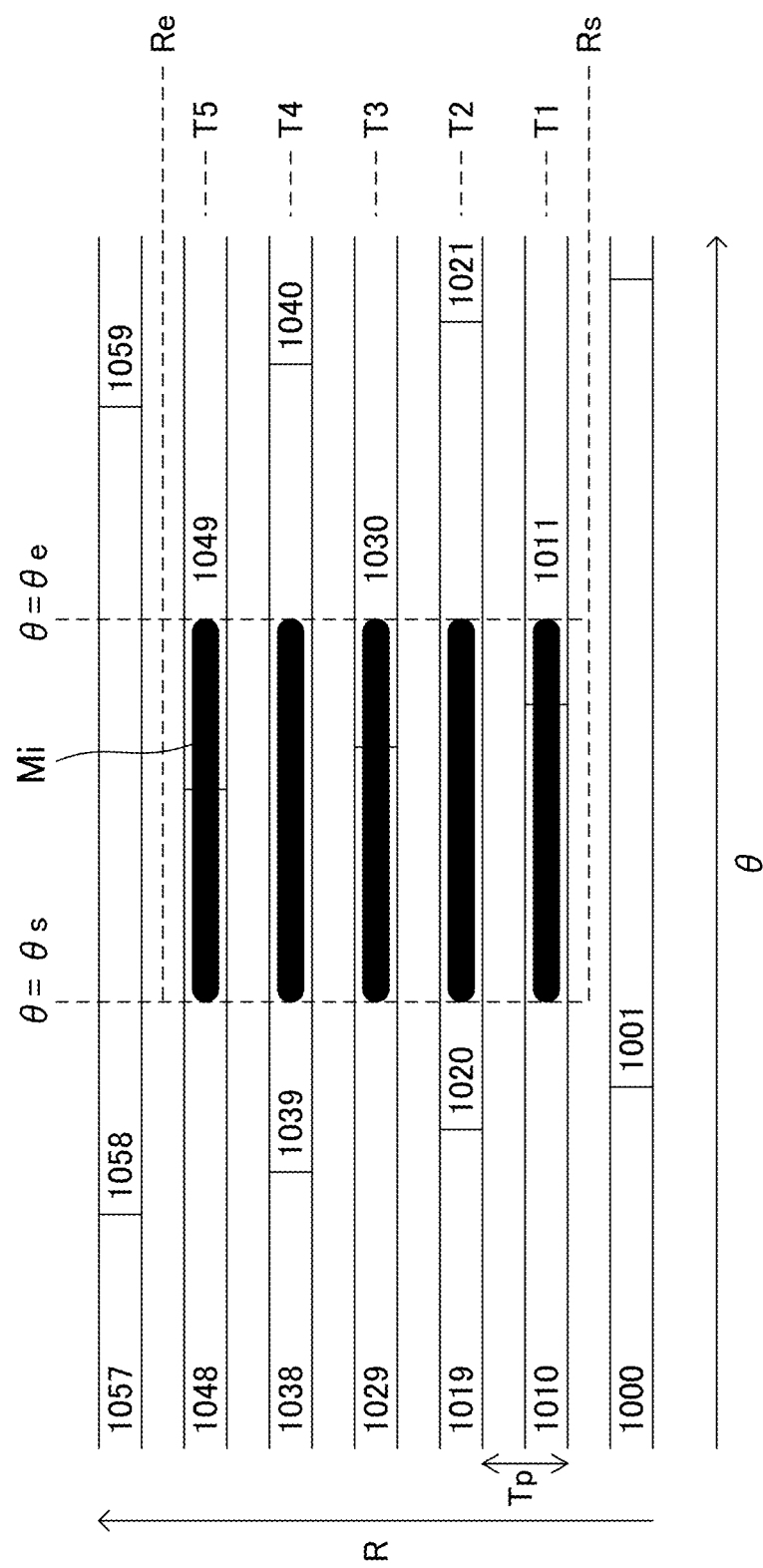

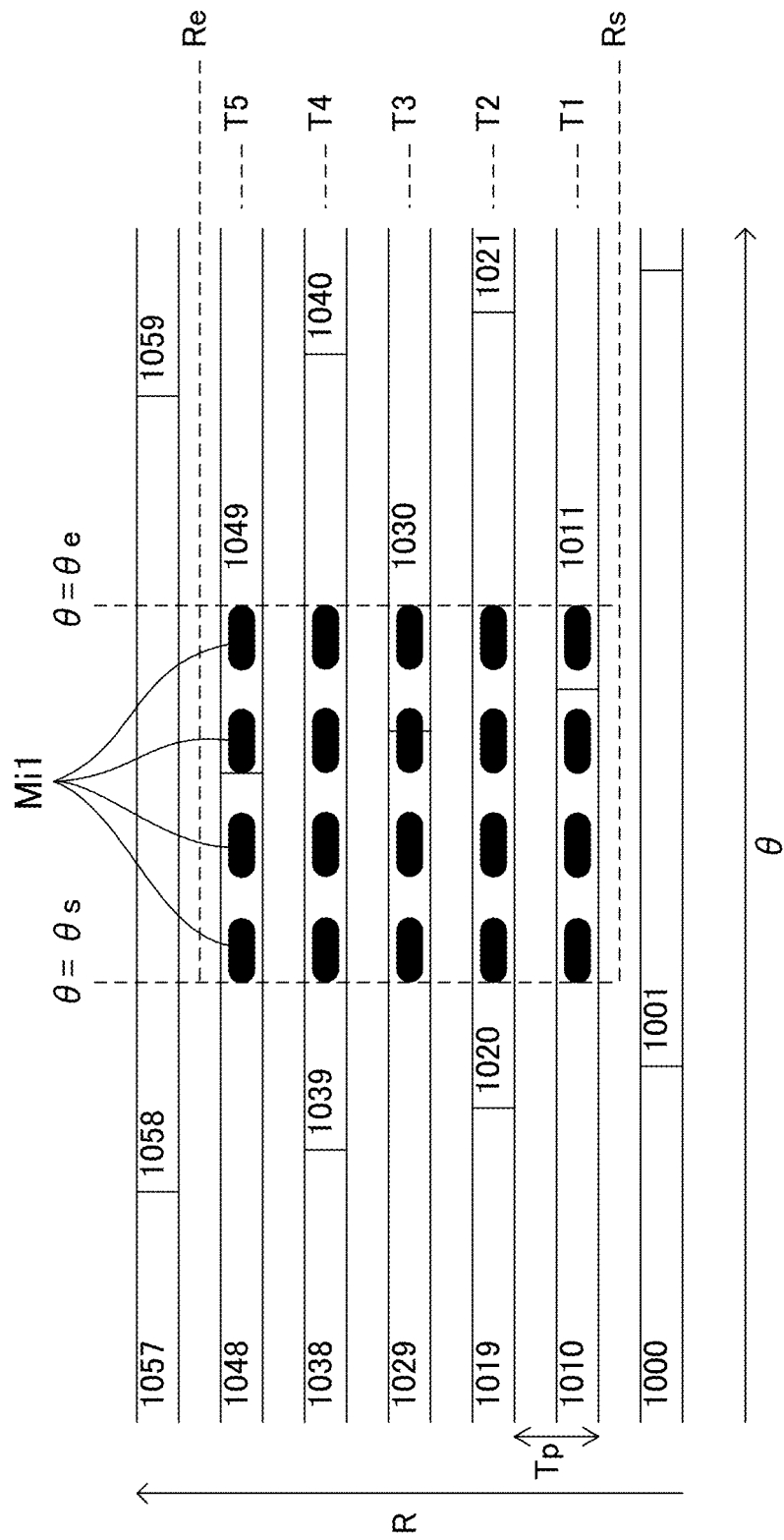

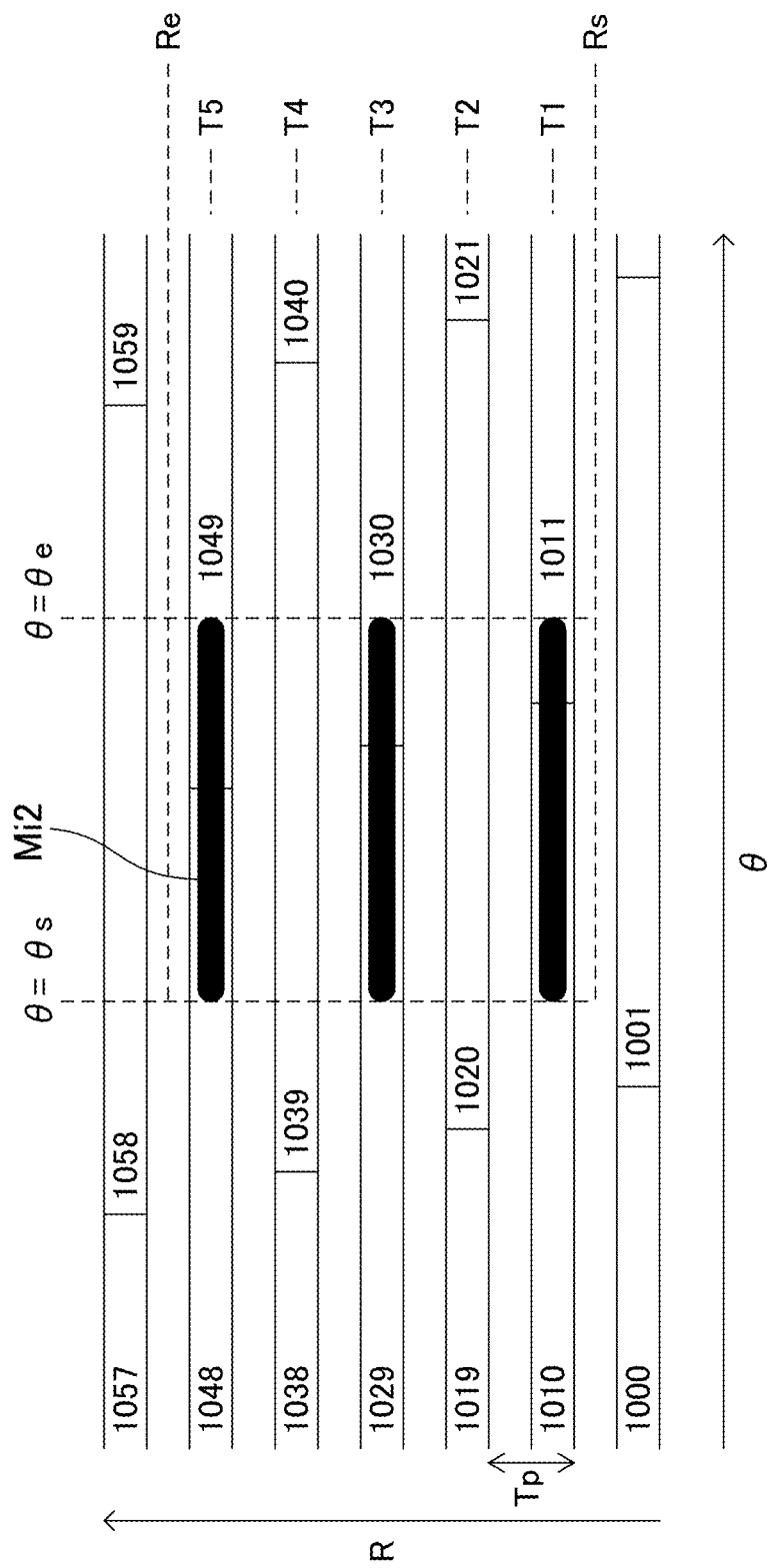

OPTICAL DISC RECORDING DEVICE AND OPTICAL DISC RECORDING METHOD

CROSS REFERENCE TO RELATED APPLICATIONS

This application is based on Japanese Patent Application (No. 2018-013414) filed on Jan. 30, 2018 and Japanese Patent Application (No. 2019-007545) filed on Jan. 21, 2019, the contents of which are incorporated herein by reference.

BACKGROUND OF THE INVENTION

1. Field of the Invention

The present disclosure relates to an optical disc recording device and an optical disc recording method for forming, on an optical disc, image information such as characters, a picture, or the like that can be recognized visually or read by an optical reading device or the like.

2. Description of the Related Art

Optical disc recording methods capable of forming a visually recognizable image (visible image) such as characters, a symbol, a picture, or a photograph on the recording surface of an optical disc on which data are recorded or to be recorded are known (refer to JP-B-3846373, for example). Optical disc recording methods of this type allow a user to recognize information, such as a title of recorded contents, relating to data recorded on an optical disc by looking at its recording surface.

In conventional optical disc recording methods, a visible image is formed by establishing a state that additional writing is disabled, calculating a formation start address and a formation end address in a free area, and recording image data of a visible image in the region between these addresses. In this case, the visible image is formed at a prescribed position by performing, in the radial direction of the optical disc, a feed control on a feed motor for moving an optical pickup in the disc radial direction and performing, in the circumferential direction, a rotation control on a spindle motor for rotating the optical disc. As a result, the accuracy of the visible image depends on the positional accuracy of drive controls on these motors and hence image formation can be performed only within a range of mechanical positional accuracy that includes the accuracy of motor drive mechanisms and the eccentricity of the optical disc.

SUMMARY OF THE INVENTION

The content of the present disclosure has been conceived in view of the above circumstances in the art, and an object of the present disclosure is therefore to provide an optical disc recording device and an optical disc recording method that make it possible to form highly accurate image information on the recording surface of an optical disc.

The present disclosure discloses an optical disc recording device for forming image information on a recording surface of a disc-shaped recording target medium, including: a data acquisition unit configured to acquire bitmap data corresponding to the image information, an address information acquisition unit configured to acquire, by wobble synchronization, from an optical disc that is the recording target medium and in which an information recording track has wobbles, address information set in the wobbles, a recording position determining unit configured to determine a recording position on the optical disc for recording the bitmap data using the address information, and a mark recording unit configured to form a recording mark corresponding to the bitmap data on the information recording track of the optical disc by applying a light beam having recording power to the recording position on the optical disc.

The disclosure also provides an optical disc recording method for forming image information on a recording surface of a disc-shaped recording target medium by an optical disc recording device, the method including: acquiring bitmap data corresponding to the image information; acquiring, by wobble synchronization, from an optical disc that is the recording target medium and in which an information recording track has wobbles, address information set in the wobbles, determining recording a position on the optical disc for recording the bitmap data using the address information, and forming a recording mark corresponding to the bitmap data on the information recording track of the optical disc by applying a light beam having recording power to the recording positions on the optical disc.

The disclosure makes it possible to form highly accurate image information on the recording surface of an optical disc.

BRIEF DESCRIPTION OF THE DRAWINGS

FIG. 7 illustrates a specific example of mark forming positions calculation processing.

FIG. 8 shows a specific example of a pattern of recording marks.

FIG. 9 shows a first example pattern of recording marks that express gradation.

FIG. 10 shows a second example pattern of recording marks that express gradation.

DETAILED DESCRIPTION OF THE EXEMPLARY EMBODIMENTS

An optical disc recording device and an optical disc recording method according to a specific embodiment of the present disclosure will be hereinafter described in detail by referring to the accompanying drawings when necessary. However, unnecessarily detailed descriptions may be avoided. For example, detailed descriptions of well-known items and duplicated descriptions of constituent elements having substantially the same ones already described may be omitted. These are to prevent the following description from becoming unnecessarily redundant and thereby facilitate understanding of those skilled in the art. The following description and the accompanying drawings are provided to allow those skilled in the art to understand the disclosure sufficiently and are not intended to restrict the subject matter set forth in the claims.

(Rough Configuration of Optical Disc Recording Device)

The optical disc recording device according to the embodiment uses, as a disc-shaped recording target medium, a write-once or rewritable optical disc medium on whose recording surface recording marks can be formed among optical disc media such as a BD (Blu-ray (registered trademark) disc), a DVD, and a CD. The embodiment assumes that an information recording track (e.g., groove track) on the recording surface is wobbled.

By forming recording marks on the recording surface of an optical disc, the optical disc recording device according to the embodiment can record or form recording data of various kinds of user data such as video data or computer data and image information that is a visually recognizable image (visible image) such as characters, a symbol, a photograph, or a figure. The image information is not limited to information that is visible to human naked eyes and includes information that can be read by, for example, an optical reading device that uses prescribed light such as laser light.

From the viewpoint of visibility of image information formed on the recording surface, a write-once optical disc medium such as a BD-R or a DVD-R is even preferable. The image information formed on the optical disc is image information that is visible to human eyes or can be read optically by an optical reading device or the like not in a state that the optical disc is mounted in the optical disc recording device, that is, not in a state that a prescribed track is being tracked with the optical disc rotated.

Figure 1:
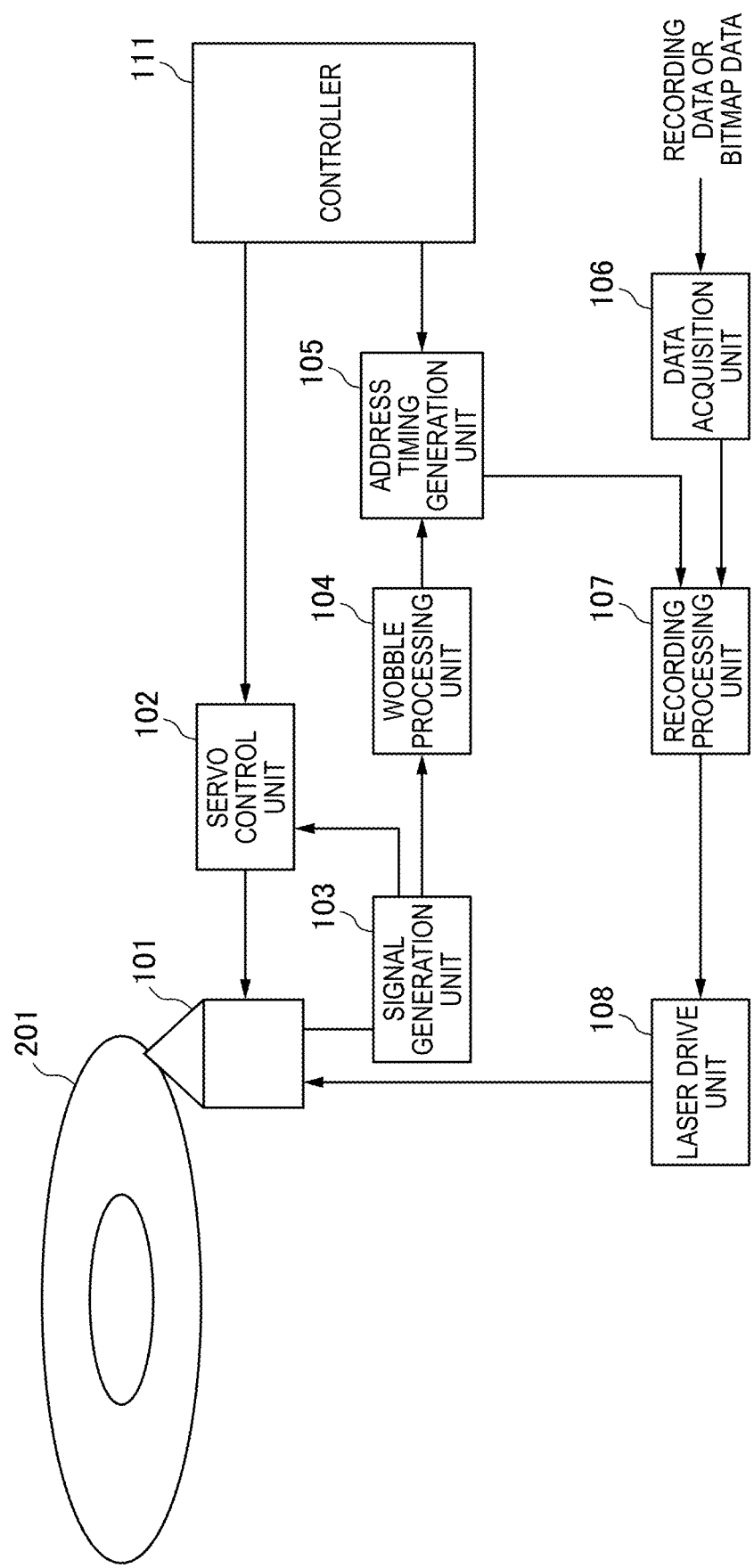
FIG. 1 is a block diagram showing an example configuration of an optical disc recording device according to an embodiment.

FIG. 1 is a block diagram showing an example configuration of the optical disc recording device according to the embodiment. The optical disc recording device is equipped with an optical head 101, a servo control unit 102, a signal generation unit 103, a wobble processing unit 104, an address timing generation unit 105, a data acquisition unit 106, a recording processing unit 107, a laser drive unit 108, and a controller 111.

An optical disc 201 which is a recording medium is mounted in the optical disc recording device. The optical head 101, which includes a laser light source, an object lens, and a photodetector, applies a light beam to the optical disc 201 and receives a light beam reflected from the optical disc 201. For example, the photodetector of the optical head 101 is divided into two parts in each of the track groove direction (tangential direction, circumferential direction) and the radial direction and is thus composed of four divisional photodetectors, each of which converts a light beam received from the optical disc 201 into an electrical signal having a voltage level indicating light quantity information of the received light beam.

The signal generation unit 103 generates a focusing error signal, a tracking error signal, a wobble signal, and a full-addition signal on the basis of the electrical signals that are output from the respective divisional photodetectors of the optical head 101.

The full-addition signal is a signal obtained by adding all of the output signals of the four respective divisional photodetectors and hence indicates the light quantity itself of the light beam reflected from the optical disc 201. The focusing error signal is a signal generated through detection using an astigmatism method, for example. The focusing error signal is obtained by adding two signals that are output from each set of two diagonal divisional photodetectors and calculating the difference between the addition signals obtained from the two respective sets of diagonal divisional photodetectors.

The tracking error signal and the wobble signal are signals generated through detection using a push-pull method. Each of the tracking error signal and the wobble signal is obtained by adding two signals that are output from each set of two divisional photodetectors arranged in the tangential direction and calculating the difference between the addition signals obtained from the two respective sets of divisional photodetectors. The tracking error signal is generated by extracting a frequency component of 0 Hz to several tens of kilohertz from the push-pull signal. The wobble signal is generated by extracting a frequency component of several tens of kilohertz to several megahertz from the push-pull signal.

The servo control unit 102 focuses a light spot on the recording surface of the optical disc 201 by driving the object lens of the optical head 101 in the direction perpendicular to the optical disc 201 so that the focusing error signal becomes equal to zero. Furthermore, the servo control unit 102 causes the light spot to follow a groove formed on the recording surface of the optical disc 201 by driving the object lens of the optical head 101 in the radial direction of the optical head 101 so that the tracking error signal becomes equal to zero.

There are optical disc recording devices in which data is recorded on lands and grooves rather than only on grooves. When the present disclosure is applied to such optical disc recording devices, the servo control unit 102 causes a recording light spot to follow the land or groove.

The wobble processing unit 104 processes the wobble signal generated by the signal generation unit 103. Having functions of an address information acquisition unit, the wobble processing unit 104 generates a wobble clock by multiplying a reproduction signal corresponding to a basic wobble portion of the optical disc 201, performs sync (ADIP sync) detection of an address information unit (ADIP: address in pre-groove) containing address information as cluster position information, and reproduces the address information.

The address timing generation unit 105 generates timing signals for recording processing on the basis of various signals generated by the wobble processing unit 104 and outputs the generated timing signals to the recording processing unit 107. In doing so, the address timing generation unit 105 utilizes a target address in an instruction from the controller 111.

In recording information, the individual units of the optical disc recording device perform the following operations. In recording user data, the data acquisition unit 106 receives recording data of user data, storing the received data in a memory, and performs various kinds of data conversion processing such as addition of error correction codes and modulation to binary data. In forming image information, the data acquisition unit 106 receives bitmap data of the image information, stores it in the memory, and performs data conversion processing such as conversion into polar coordinates if necessary.

Having functions of a recording position determining unit, the recording processing unit 107 determines a recording position on the optical disc 201 on the basis of the acquired recording data or bitmap data. The recording processing unit 107 outputs a light emission control signal to the laser drive unit 108 on the basis of a recording signal as subjected to the data conversion processing according to timing of a recording target address generated by the address timing generation unit 105, and thereby instructs the laser drive unit 108 to cause emission of a light beam having a recording power corresponding to the determined recording position. The laser drive unit 108 drives the laser light source of the optical head 101 according to the light emission control signal and thereby causes the optical head 101 to emit a light beam having the above recording power.

Recording marks are formed on the recording surface of the optical disc 201 by the above recording operation. Each recording mark is formed in units of a channel bit of each cluster that is a data recording unit of the optical disc 201 according to recording information "0" or "1."

Where the optical disc 201 is a BD, each recording mark has a mark length of 2T (shortest mark length) to 9T where T is a channel bit length.

(Rough Structure of Optical Disc 201)

Figure 2:
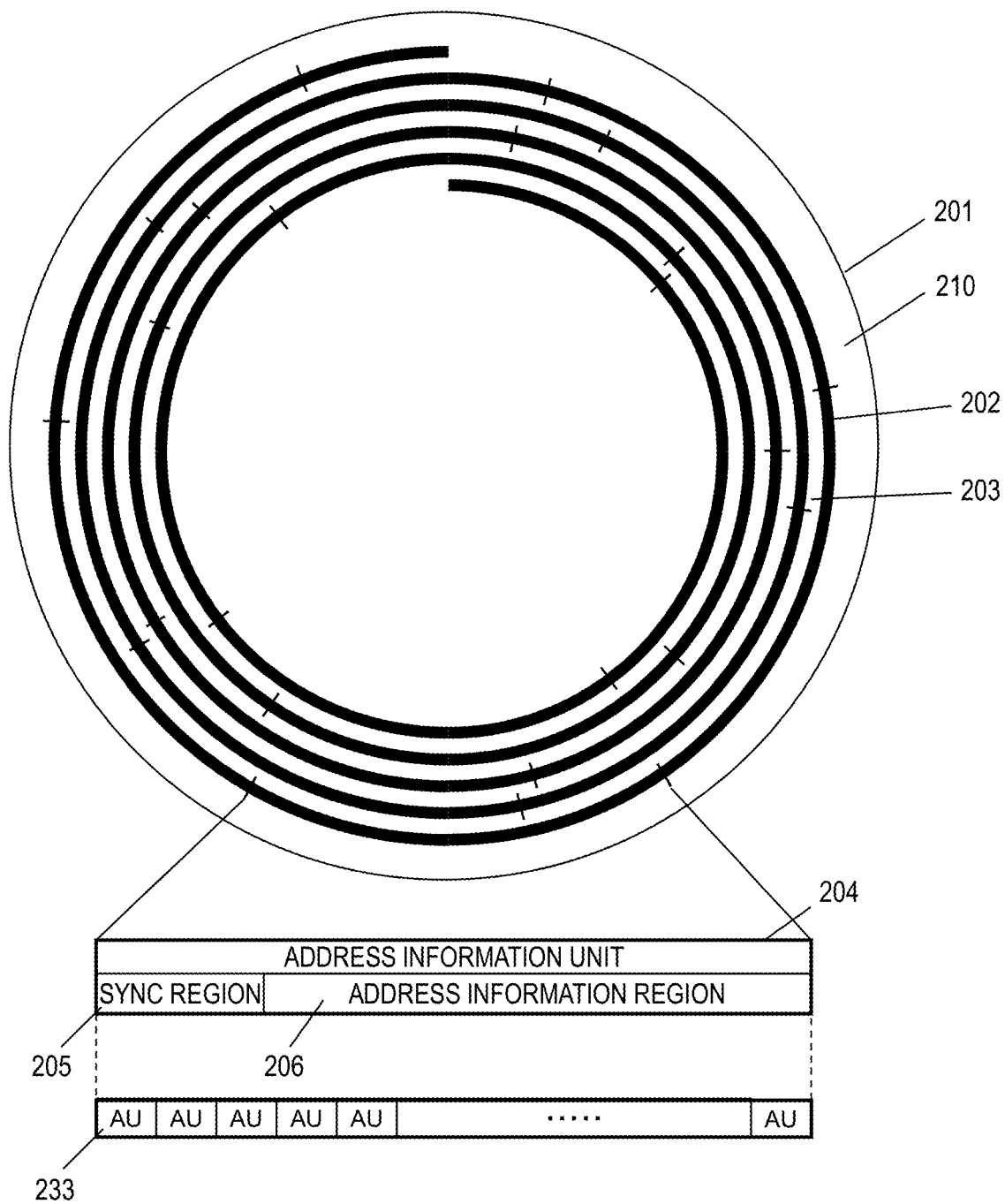
FIG. 2 is a schematic diagram showing an example structure of an optical disc employed in the embodiment.

FIG. 2 is a schematic diagram showing an example structure of the optical disc 201 employed in the embodiment. The example structure of the optical disc 201 which is used as a recording medium in the optical disc recording device according to the embodiment will be described below.

In the optical disc 201, a groove track (hereinafter also referred to merely as "groove" or "grooves") 202 is formed in spiral form. A land track (hereinafter also referred to merely as "land" or "lands") 203 is formed in spiral form between grooves 202. In the optical disc 201, user data or image information can be recorded or formed on the grooves 202. That is, the grooves 202 can be used as recording track. Alternatively, the optical disc 201 may be such that user data or image information can be recorded or formed on both of the grooves 202 and the lands 203.

The grooves 202 are divided into plural units having a prescribed length in the track groove direction (circumferential direction). Each divisional unit of the grooves 202 constitutes an address information unit (ADIP) 204. Each ADIP 204 has one piece of address information for each unit region of the optical disc 201. Each ADIP 204 has a sync region 205 as a head region and an address information region 206 that follows the sync region 205. From another point of view, each ADIP 204 consists of plural ADIP units (AUs) 233.

Figure 3:
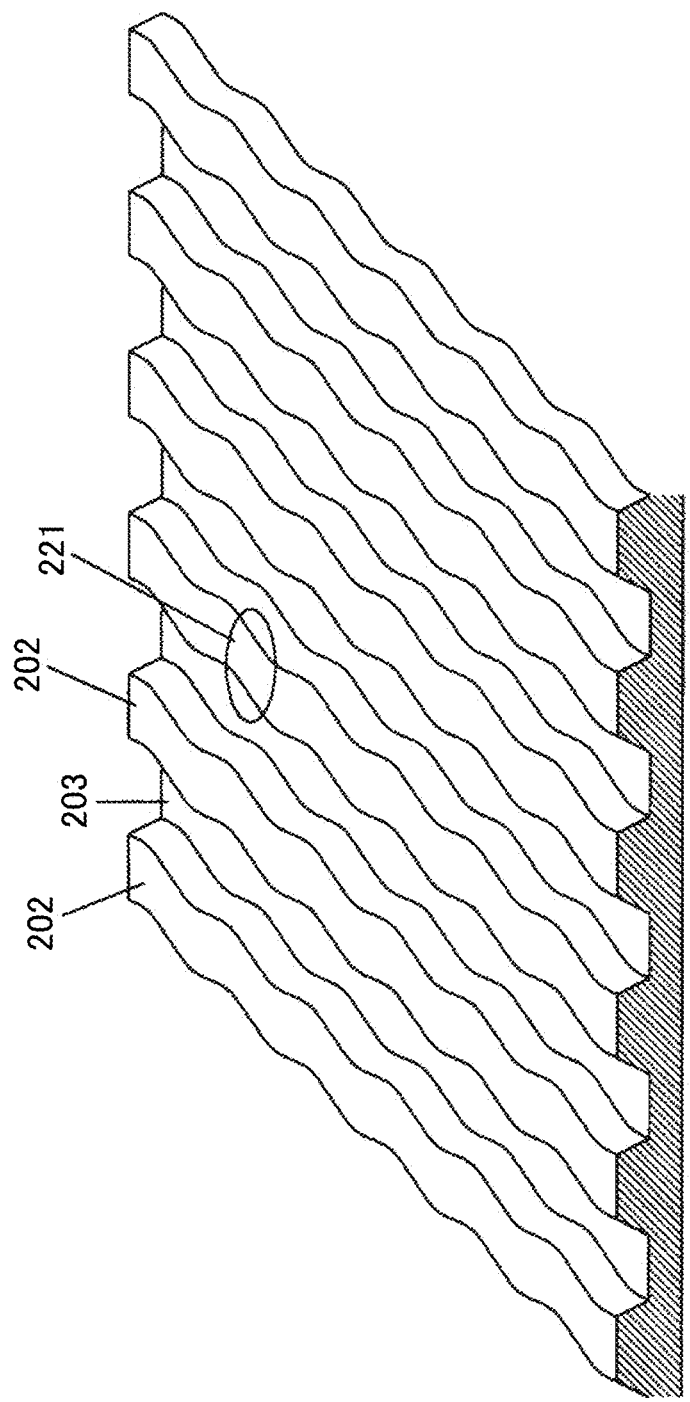
FIG. 3 is a perspective view showing an example structure of the recording surface of the optical disc.

FIG. 3 is a perspective view showing an example structure of the recording surface of the optical disc 201 and is an enlarged view of part of the recording surface.

When the optical disc 201 is manufactured, the grooves 202 are formed in such a manner that portions that are formed as grooves on a stamper are transferred to the recording surface. Thus, the grooves 202 are located on the side closer to the light source of the optical head 101. When grooves are formed on a stamper by a disc manufacturing machine, the grooves are formed so as to be approximately constant in width because they are formed with constant beam strength. As a result, the grooves 202 of the optical disc 201 which are formed by transferring the grooves on the stamper are formed so as to be approximately constant in width on the entire surface of the optical disc 201. The lands 203 exist between the grooves 202.

The grooves 202 and the lands 203 are snaked at a constant pitch to form wobbles in most of their lengths. The pitch of the wobbles is set shorter than a distance corresponding to a reaction speed of a follow operation that a light spot 221 follows a groove 202. As a result, a variation occurs in the positional relationship between the light spot 221 and the groove 202 and a wobble shape can be detected by detecting this variation optically and converting it into an electrical signal.

When a wobble is detected, a clock is generated that is in synchronism with a resulting detection signal. This clock is used for detecting a physical length and a linear velocity in the optical disc 201. Or this clock can be used for reproducing side information that is recorded by varying the wobble shape. In the optical disc 201 used in the embodiment, address information is recorded by wobbles. Detecting wobble shapes in synchronism with the timing of wobbles of the track of the optical disc 201 is referred as "wobble synchronization."

Figure 4:
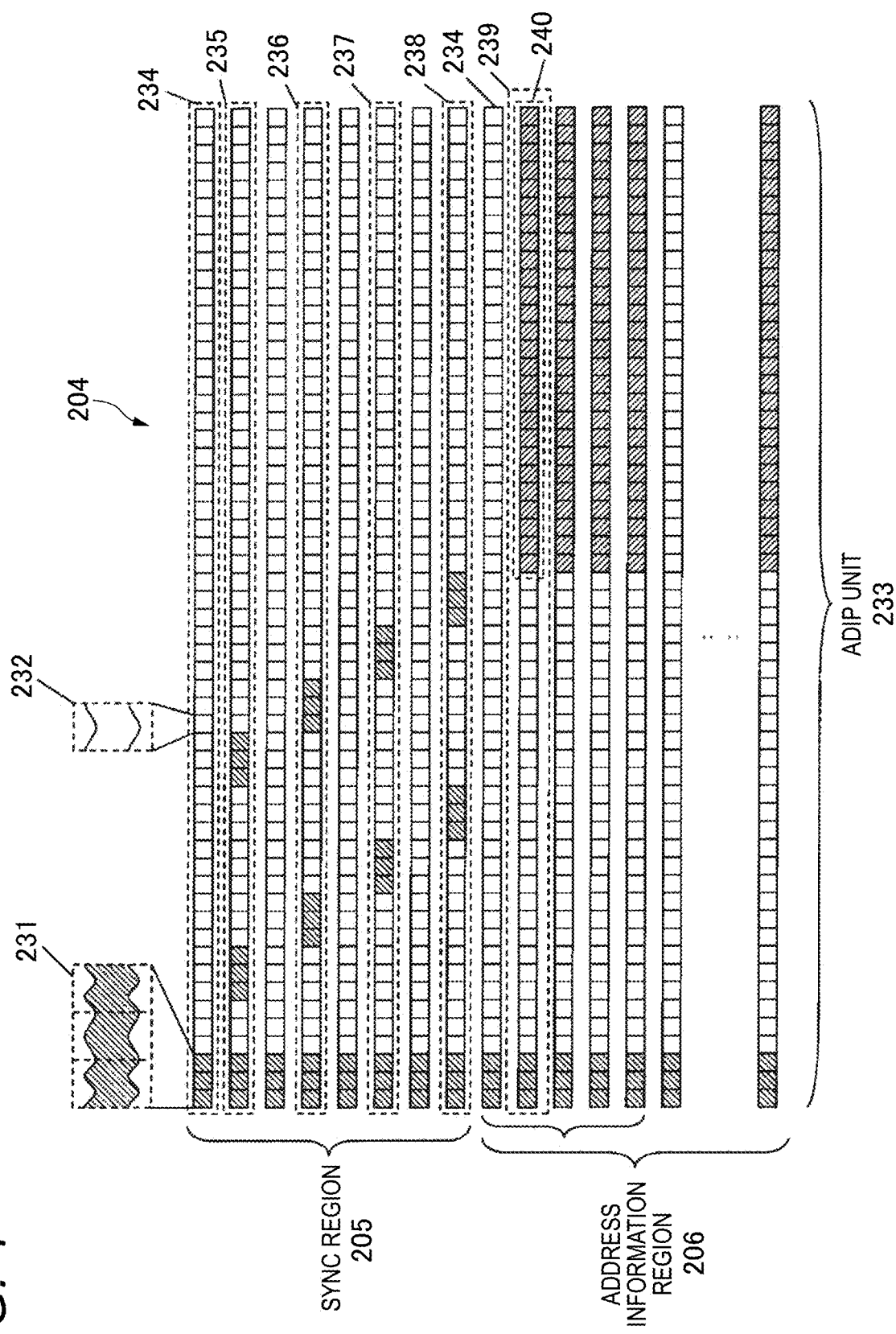
FIG. 4 is a diagram showing an example structure of each address information unit of the optical disc.

FIG. 4 is a diagram showing an example structure of each address information unit (ADIP) of the optical disc 201.

Each ADIP 204 consists of a prescribed number of ADIP units 233. For the sake of convenience, FIG. 4 is drawn in such a manner that the ADIP units 233 that are actually arranged continuously in each ADIP 204 as shown in FIG. 2 are divided and shown in parallel with each other. A major part of each ADIP 204 consists of basic wobbles 232. The shape of the basic wobble 232 corresponds to, for example, a one-cycle waveform of $+\cos \omega t$. The basic wobble 232 (one pitch) has a waveform that transitions are made in order of a maximum inward displacement, a maximum outward displacement, and the maximum inward displacement.

In each ADIP 204, the part other than the basic wobbles 232 consists of wobbles having the same pitch as the basic wobbles 232. The pitch or cycle of the basic wobble 232 will be hereinafter referred to as a "wobble pitch or cycle." In the example shown in FIG. 4, each ADIP unit 233 has 56 wobble cycles.

The three head wobble cycles of each ADIP unit 233 constitute an MSK (minimum shift keying) mark 231 which indicates a boundary with the adjoining ADIP unit 233. For example, the MSK mark 231 is formed by connecting wobbles having respective waveforms $+\cos 1.5 \omega t$, $-\cos \omega t$, and $-\cos 1.5 \omega t$ of one cycle. The second wobble having the waveform $-\cos \omega t$ of the MSK mark 231 is reverse in phase to the basic wobble 232. Thus, the position of each MSK mark 231 can be detected by phase detection using a signal that is synchronized with the timing of basic wobbles 232.

Part of the ADIP units 233 of each ADIP 204 are in the sync region 205 and the other part of the ADIP units 233 are in the address information region 206. In each ADIP unit 233, the 53 wobbles following the MSK mark 231 have a particular pattern corresponding to a function given to them.

First, the ADIP units 233 in the sync region 205 of each ADIP 204 will be described. Monotone ADIP units 234, a first sync ADIP unit 235, a second sync ADIP unit 236, a third sync ADIP unit 237, and a fourth sync ADIP unit 238 are arranged in the sync region 205.

In each monotone ADIP unit 234, all of the wobbles other than the head MSK mark 231 are a basic wobble 232. This is to generate, stably, a clock that is synchronized with the timing of wobbles. The first sync ADIP unit 235, the second sync ADIP unit 236, the third sync ADIP unit 237, and the fourth sync ADIP unit 238 serve to determine a position in the ADIP 204. And they are provided near the head of the ADIP 204. The ADIP 204 has no ADIP unit 233 having the same pattern as any of them.

Next, the ADIP units 233 in the address information region 206 of each ADIP 204 will be described. Monotone ADIP units 234 and address information ADIP units 239 are arranged in the address information region 206.

For example, the address information region 206 consists of 15 units each consisting of one monotone ADIP unit 234 and four address information ADIP units 239.

Each address information ADIP unit 239 has information of one bit, and the address information region 206 which includes 75 ADIP units 233 (60 address information ADIP units 239) has information of 60 bits as a whole. One-bit information is recorded in address information wobbles 240 of each address information ADIP unit 239. The 60-bit information may include not only address information indicating a physical position in the optical disc 201 but also side information such as layer information of a multi-layer disc, information relating to conditions for recording on the optical disc 201, and copyright information and an error correction/error detection code for those pieces of information.

Each address information ADIP unit 239 includes an MSK mark 231, basic wobbles 232, and address information wobbles 240. Each address information ADIP unit 239 has an MSK mark 231 as three head wobbles, 27 basic wobbles 232 that follow the MSK mark 231, and 26 address information wobbles 240 that follow the 27 basic wobbles 232. Each set of address information wobbles 240 is formed according to address information and expresses address information "0" or "1." Thus, address information can be acquired by wobble synchronization by detecting wobble shapes of the address information wobbles 240 in synchronism with their timing.

Where the optical disc 201 is a BD, address information wobbles 240 have shapes that are formed using STWs (saw-tooth wobbles) so as to be superimposed on MSK wobbles. Unlike the MSK wobble, the signal energy of the STW is distributed in space and hence it is detected through integration. Thus, the STW is resistant to a partial defect. Since the address information wobbles 240 employ both of MSK and STWs, more robust detection of address information is enabled.

(Setting of Image Information Recording Area)

Next, how to set an image information recording area on the optical disc 201 will be outlined.

Figure 5:
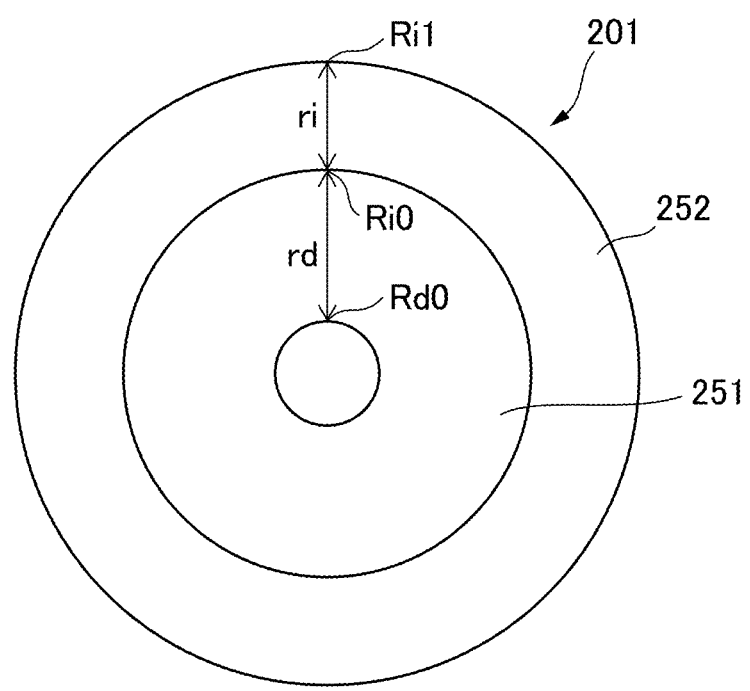
FIG. 5 illustrates an example of how to set a recording area of image information on the optical disc.

FIG. 5 illustrates an example of how to set a recording area of image information on the optical disc 201. A user data recording area 251 and an image information recording area 252 are set on the optical disc 201. In the example shown in FIG. 5, the image information recording area 252 is set adjacent to the outer circumference of the optical disc 201.

In forming image information on the recording surface of the optical disc 201, the image information recording area 252 is set adjacent to the outer circumference of the recording surface as part of a disc format. In doing so, a start position Ri0 and an end position Ri1 of the image information recording area 252 on the basis of the address information of the optical disc 201. In the example shown in FIG. 5, the other area, adjacent to its inner circumference, of the recording surface is set as the user data recording area 251.

In FIG. 5, symbol rd denotes the length in the disc radial direction from the start position Rd0 of the user data recording area 251 (i.e., the position of the innermost track of the disc recording area) to the end position Ri1 of the user data recording area 251 (i.e., the start position Ri0 of the image information recording area 252). And ri denotes the length in the disc radial direction from the start position Ri0 of the image information recording area 252 to its end position Ri1. Each of the lengths ri and rd in the disc radial direction is determined from a track pitch (the interval between adjacent tracks) Tp and the number of tracks in the area 251 or 252.

As for setting of the image information recording area 252, recording areas may be set in advance according to a disc format at the time of, for example, disc formatting of the optical disc 201 so that the image information recording area 252 is secured or recording areas may be set every time image information is formed. Where the optical disc 201 is a BD, recording areas can be set in a desired manner.

(Image Information Recording Operation)

Next, a description will be made of an operation for forming image information on the recording surface of the optical disc 201 by the optical disc recording device according to the embodiment.

Figure 6:
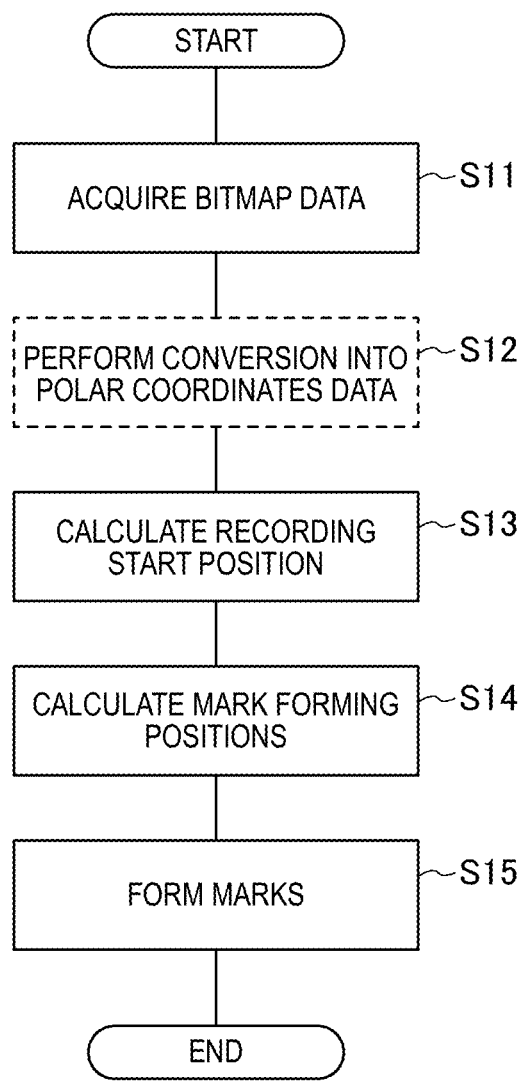
FIG. 6 is a flowchart showing the procedure of a process for forming image information by an optical disc recording method according to the embodiment.

FIG. 6 is a flowchart showing the procedure of a process for forming image information by the optical disc recording method according to the embodiment.

At step S11, the data acquisition unit 106 acquires bitmap data of image information and stores it in the memory. The bitmap data can be acquired by various methods such as receiving recording target image data according to a user instruction, generating recording image data according to user manipulations, or receiving recording target image data transmitted from the outside. This may be done using any of various kinds of software programs such as external application software for generation of image information, application software for selection and input of bitmap data, and interface software for reception of bitmap data.

Image information may be any of various kinds of information that can be recognized visually or read by an optical reading device or the like, such as characters, a symbol, a picture, a photograph, a figure, a pattern, a two-dimensional code such as a QR code (registered trademark), a barcode, and a watermark. Image information recorded on the optical disc 201 is not limited to a black-and-white binary image and may be a gray scale (gradation) image formed using halftone dots.

Then, if necessary, at step S12, the data acquisition unit 106 subjects the bitmap data to conversion into polar coordinates data (data conversion processing). That is, the data acquisition unit 106 converts X-Y orthogonal coordinates data into r-θ polar coordinates data. For example, where the bitmap data is an image such as a photograph or a code pattern such as a two-dimensional code, conversion from X-Y orthogonal coordinates data into r-θ polar coordinates data is performed because image information formed on the optical disc 201 may become hard to recognize if it is distorted. It is preferable to convert the bitmap data into polar coordinates data because the latter makes it easier to calculate a recording start position, mark forming positions, a recording end position, etc. on the optical disc 201.

Where the bitmap data represent characters, the characters formed can be recognized satisfactorily even if X and Y themselves are regarded as r and θ, respectively (i.e., conversion into polar coordinates is not performed); the conversion into polar coordinates is not indispensable.

At step S13, in the optical disc recording device, the recording processing unit 107 calculates a recording mark recording start position (example recording position) on the recording surface of the optical disc 201. To do so, the recording processing unit 107 calculates, as a recording mark formation start position, a position R in the radial direction and a position θ in the circumferential direction (track groove direction) on the basis of the bitmap data to be recorded. A position R in the radial direction is calculated by calculating the number of tracks from a reference track on the basis of address information in the recording area. A position θ in the circumferential direction is calculated by calculating the number of clusters (the cluster is a unit of data recording) from a reference position (reference cluster) of the track concerned on the basis of the address information in the recording area. A recording end position may be calculated as another example recording position together with the recording mark recording start position.

At step S14, the recording processing unit 107 calculates recording mark forming positions (mark forming positions; example recording positions) of recording marks to be formed so as to correspond to the recording target image on the basis of the bitmap data of the image information. To do so, the recording processing unit 107 calculates, as each mark forming position, a value expressed by a cluster address and the number of channel bits in the cluster on the basis of the bitmap data. A specific example of the mark forming positions calculation processing will be described later.

At step S15, the optical disc recording device forms recording marks according to the recording mark forming positions that were calculated at step S14 on the basis of the bitmap data. To do so, the recording processing unit 107 generates a light emission control signal according to the mark forming positions and the laser drive unit 108 drives the laser light source of the optical head 101 according to the light emission control signal to cause the optical head 101 to emit a light beam having resulting recording power. As a result, recording marks are formed at prescribed mark forming positions on the recording surface of the optical disc 201 in units of a track and a channel bit, whereby highly accurate image information is formed on tracks with the accuracy of a channel bit.

(Specific Example of Recording Marks)

FIG. 7 illustrates a specific example of mark forming positions calculation processing. FIG. 7 schematically shows part of the recording surface (two-dimensional surface) of the optical disc 201 in polar coordinates form. The horizontal axis represents the position θ in the circumferential direction and the vertical axis represents the position R in the radial direction. The position R in the radial direction corresponds to the track position, and numerals 1000, 1001, . . . shown on tracks indicate cluster addresses. A specific example of a case that the optical disc 201 is a BD will be described below.

FIG. 7 shows an area Aw where to form recording marks in a case of forming a black, approximately rectangular binary image. More specifically, FIG. 7 shows an example that an image is formed (drawn) according to bitmap data so as to "paint out" the area Aw in which R is in a range of Rs to Re and θ is in a range of θs to θe by changing a color or density of the area. In the following description, recording marks formed on the recording surface will be referred to simply as "marks."

First, a method for determining tracks on which to form marks to produce an image in the area Aw will be described. It is assumed that the start position of a reference cluster is θ=0 and R=R0 and the track pitch (the interval between adjacent tracks) is equal to Tp. The number Ts of tracks from the position R0 of the reference cluster to the recording start position Rs is given by the integer part of (Rs−R0)/Tp. The number Te of tracks from the position R0 of the reference cluster to the recording end position Re is given by the integer part of (Re−R0)/Tp. Using the numbers Ts and Te, marks are formed on tracks from a Tsth track to a Teth track as counted from the track (0th track) on which the reference cluster exists.

Next, a method for calculating a position having a circumferential coordinate θn on a Tnth track. First, a reference position having a circumferential coordinate θ=0 on the Tnth track is determined by calculating the number of clusters from the reference cluster. The number Cn of clusters from the reference cluster to a position having the circumferential coordinate θn on the Tnth track is given by the following Equation (1) by dividing the area of a donut shape from the radial position R0 of the reference cluster to a position (R0+Tn*Tp) by the area of one cluster ((cluster length)*Tp):

$$Cn=(PI*(R0+Tn*Tp)^{\wedge}2-PI*R0^{\wedge}2)/(Tp*Lc) \qquad (1)$$

where * is a multiplication operator, ^ is an exponentiation operator, and Lc is the physical length of one cluster (cluster length).

In Equation (1), the integer part of a calculation result of Cn represents the number of clusters as counted from the reference cluster (0th cluster), that is, where the cluster concerned is located in the series of clusters from the reference cluster. A result obtained by multiplying the number of channel bit of the one cluster by the decimal part of the calculation result represents the number of channel bits Pθ0, that is, where the bit concerned is located in the series of channel bits in the cluster concerned.

Since the radius Rn of the Tnth track is given by Rn=(R0+Tn*Tp), a position Ln having a circumferential coordinate θn is given by the following Equation (2):

$$Ln=(R0+Tn*Tp)*2*PI*\theta/(2*PI) \qquad (2)$$

The position Ln means the physical length from the position having the circumferential coordinate 0 to the position having the circumferential coordinate θn on the Tnth track. The position Ln is converted into the number Nch of channel bits in the following manner:

$$Nch=Ln/Lch \qquad (3)$$

where Lch in the physical length of one channel bit (i.e., channel length).

The position Pθn of a channel bit having a circumferential coordinate θn is calculated by adding this number Nch of channel bits to the position Pθ0 of a channel bit having a circumferential coordinate 0. In this manner, it can be calculated where the cluster concerned is located in the series of clusters on the Tnth track and where the channel bit concerned is located in the series of channels in that cluster.

$$P\theta n=P\theta 0+Nch \qquad (4)$$

A track, a cluster, and a channel bit where a mark is to be formed is determined by the calculations as described above.

FIG. 8 shows a specific example of a pattern of recording marks. FIG. 8 shows examples of recording marks that are formed actually in the area Aw shown in FIG. 7. In this case, a continuous mark Mi is formed in an interval from the start position θs to the end position θe in the circumferential direction on each of the tracks from the track T1 corresponding to the start position Rs in the radial direction to the track T5 corresponding to the end position Re in the radial direction. An image that "paints out" the area Aw is expressed by the marks Mi formed in this manner, whereby a visible, approximately rectangular image can be formed.

Where the optical disc 201 is a BD, standard values are as follows:

Start position R0 in the radial direction of the reference cluster: 24.0 mm

Track pitch Tp: 0.32 μm

Physical length of one channel bit Lch: 74.5 nm

The number Ncl of channel bits of one cluster: 1,932*498=962,136.

However, at least two of the values R0, Tp, and Lch need to be fine-adjusted for an individual optical disc 201 used. In the case of the BD format, since the number of tracks amounts to about 100,000, the number of significant digits of fine-adjusted values needs to be seven or larger.

Thus, where the optical disc 201 is a BD, in the radial direction, recording marks can be formed with accuracy of 0.32 μm which is equal to the track pitch Tp. In the circumferential direction, recording marks can be formed with accuracy of 74.5 nm which is equal to the physical length of one channel bit Lch (corresponding to 1T). That is, highly accurate image information can be formed with accuracy of the track pitch Tp of the optical disc 201. Furthermore, many pieces of information can be formed in a small area.

Where recording marks are formed on both of lands and grooves of the optical disc 201 rather than only its grooves, recording marks can be formed with accuracy of ½ (0.16 μm in the case of a BD) of the track pitch Tp. Even more precise image information can be drawn in the case of an optical disc having an even smaller track pitch. In the circumferential direction, the positions of the start end and the terminal end of each recording mark can be controlled by dividing 1T into several tens of parts.

FIG. 9 shows a first example pattern of recording marks that express gradation. FIG. 9 shows example recording marks for expressing a grayscale image (i.e., an image with gradation) in the same area Aw as shown in FIG. 7. In the first example, grayscale (gradation) is expressed by marks Mi1 having spaces in between rather than a continuous mark. In this case, the density can be adjusted by changing the mark/space ratio. Even sets of recording marks having the same mark/space ratio and expressing the same density can produce different patterns and hence give different pieces of information by changing the arrangement of marks and spaces.

FIG. 10 shows a second example pattern of recording marks that express gradation. FIG. 10 shows another example of recording marks for expressing a grayscale image (i.e., an image with gradation) in the same area Aw as shown in FIG. 7. In the second example, grayscale (gradation) is expressed by marks Mi2 that are formed on part of the tracks (decimated tracks) rather than consecutive tracks. In this case, the density can be adjusted by changing the track decimation ratio. Even sets of recording marks having the same track decimation ratio and expressing the same density can produce different patterns and hence give different pieces of information by changing the arrangement of mark-forming tracks and markless tracks.

It is possible to express a grayscale image (i.e., an image with gradation) by combining the first example of FIG. 9 and the second example of FIG. 10 by setting the mark/space ratio and the track decimation ratio properly.

In forming image information on the basis of bitmap data, as shown in FIGS. 8-10, (sets of) recording marks are formed at the same position(s) in the circumferential direction in a prescribed range in the disc radial direction. In the disc radial direction, (sets of) recording marks are formed at the same position(s) in a prescribed pattern, for example, in a continuous pattern (see FIGS. 8 and 9) or every other track (see FIG. 10) or every several tracks. In this manner, visible or readable image information can be formed by aligned recording marks rather than random ones such as recording marks of user data.

(Example of Setting of Recording Area in which Image Information is Formed)

Figure 11A:
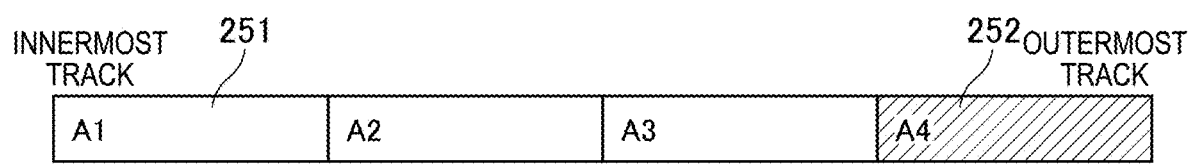
FIG. 11A shows a first example of setting of a recording area in which image information is to be formed.
Figure 11B:
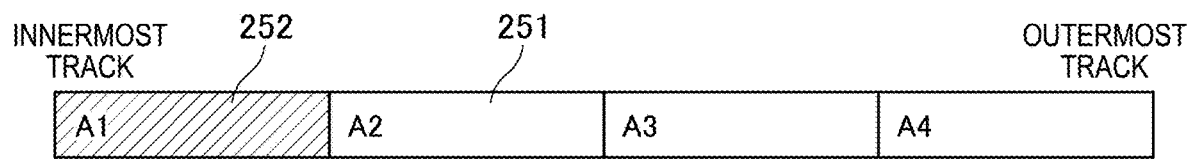
FIG. 11B shows a second example of setting of a recording area in which image information is to be formed.

FIG. 11A shows a first example of setting of a recording area in which image information is to be formed. FIG. 11B shows a second example of setting of a recording area in which image information is to be formed. FIGS. 11A and 11B show examples in which the recording format of the optical disc 201 is such that the recording area of its surface is divided into four areas A1-A4.

In the first example shown in FIG. 11A, the outermost area A4 is set as an image information recording area 252. In this case, an innermost area A1 etc. are set as a user data recording area 251 and user data are recorded there. Image information is formed in the image information recording area 252 (outermost area A4).

In the second example shown in FIG. 11B, the innermost area A1 is set as an image information recording area 252. In this case, an area A2 etc. that located outside the innermost area A1 are set as a user data recording area 251 and user data are recorded there. Image information is formed in the image information recording area 252 (innermost area A1).

The user data recording area 251 and the image information recording area 252 may be set in advance (e.g., at the time of disc formatting) before information recording. Alternatively, area setting may be made each time when a recording operation is performed. Where the optical disc 201 is a BD, recording areas can be set in a desired manner.

For certain uses of the optical disc 201, an intermediate area of the recording surface such as an area A2 or A3 may be set as an image information recording area 252 in which case image information is formed in the area between user data recording areas.

(Example Structure of Recording Layer(s) of Optical Disc 201)

Figure 12A:
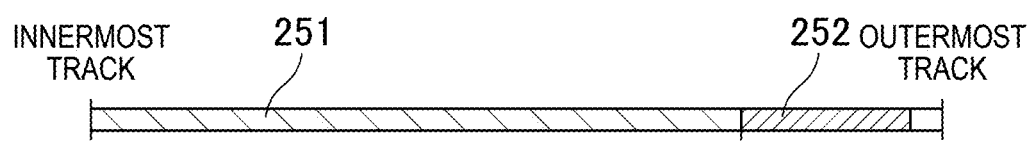
FIG. 12A shows a first example structure of a recording layer in which an image information recording area is set.
Figure 12B:
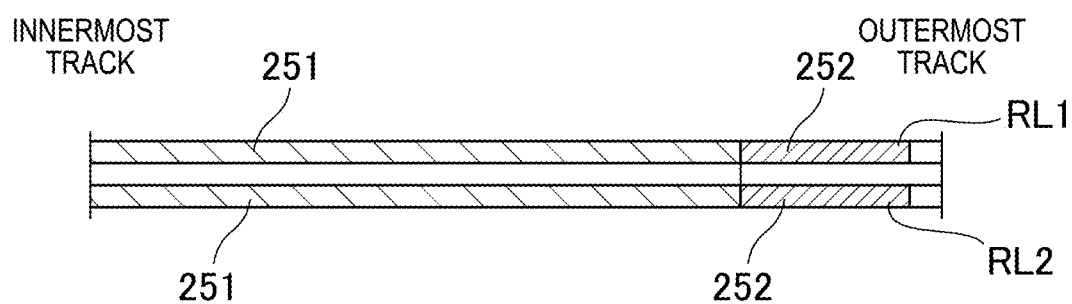
FIG. 12B shows a second example structure of recording layers in which respective image information recording areas are set.

FIG. 12A shows a first example structure of a recording layer in which an image information recording area is set. FIG. 12B shows a second example structure of recording layers in which respective image information recording areas are set. FIGS. 12A and 12B are sectional views schematically showing the recording layer(s) of the optical disc 201.

In the first example shown in FIG. 12A, which relates to a single-layer optical disc, a disc inside area is set as a user data recording area 251 and a disc outermost area is set as an image information recording area 252. In the second example shown in FIG. 12B, which relates to a double-layer optical disc, a disc inside area is set as a user data recording area 251 and a disc outermost area is set as an image information recording area 252 in each of a first layer RL1 and a second layer RL2. In this manner, also in a multilayer optical disc, image information can be formed in an image information recording area 252 that is set in the recording surface of each layer.

The area that is set as an image information recording area 252 is not limited to an outermost area of an optical disc; it is possible to set an image information recording area 252 at a desired position such as an inside position and form image information there. In the case of a multilayer optical disc, it is possible to set an image information recording area 252 at a desired position in a desired recording layer and form image information there.

(Example of how Image Information is Formed on Optical Disc 201)

Figure 13A:
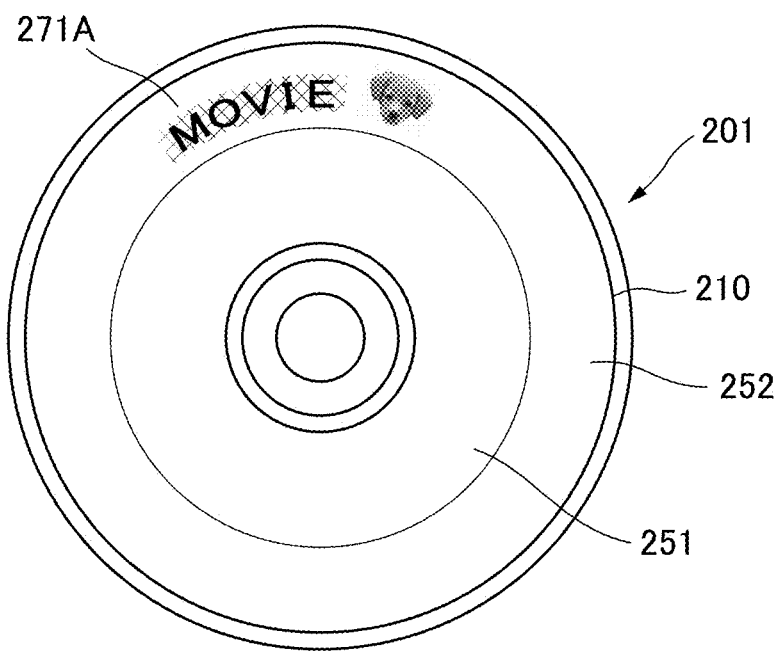
FIG. 13A shows a first example of image information formed on the optical disc.
Figure 13B:
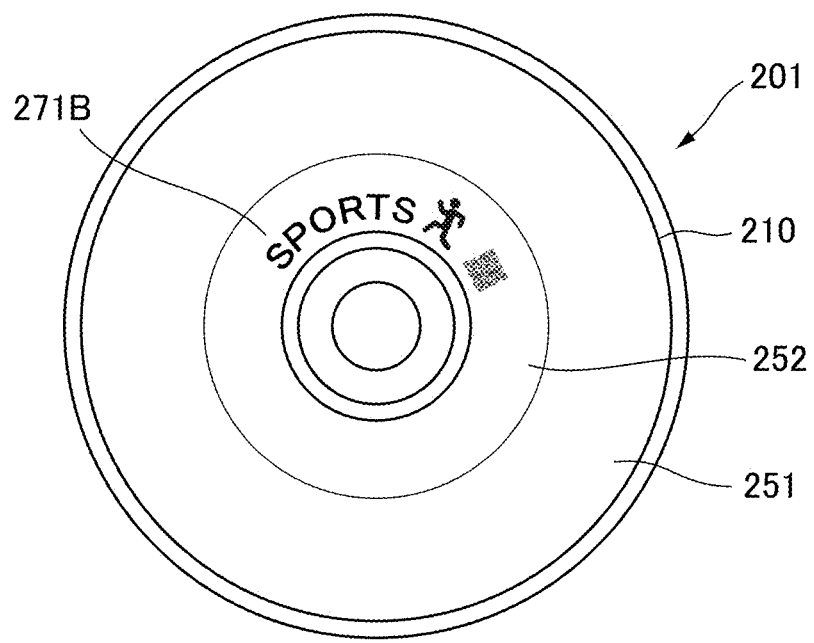
FIG. 13B shows a second example of image information formed on the optical disc.

FIG. 13A shows a first example of image information formed on the optical disc 201. FIG. 13B shows a second example of image information formed on the optical disc 201. FIGS. 13A and 13B show the surface of a recording layer of the optical disc 201.

In the first example shown in FIG. 13A, an outermost area of a recording surface 210 of the optical disc 201 is set as an image information recording area 252 and image information 271A including characters, a watermark figure, and a photograph is formed there.

In the second example shown in FIG. 13B, an innermost area of a recording surface 210 of the optical disc 201 is set as an image information recording area 252 and image information 271B including characters, a QR code (registered trademark), and a picture is formed there.

Image information can be formed according to any of various kinds of bitmap data in an image information recording area 252 that is set at a desired position on the recording surface 210 of the optical disc 201 according to a disc format. Image information can be formed either before or after recording of user data in a user data recording area 251.

Image information formed on the optical disc 201 can be read optically in a state that the optical disc 201 stands alone, that is, it is not mounted in the optical disc recording device or being rotated. Image information may be any of various kinds of information such as information that can be recognized visually by human naked eyes or information that can be read by, for example, an optical reading device that uses reference light such as laser light having a particular wavelength.

Image information can be used for judging whether the user data recorded on the optical disc 201 is genuine or false data by having a pattern such as a watermark figure contain side information such as copyright information or serial information. In this case, a setting is made so that various kinds of side information are represented by respective patterns and image information representing particular side information is buried in the form of a pattern. A user can judge whether the user data has suffered illegal copying or falsification by reading the buried side information by detecting the pattern of the image information.

As described above, the optical disc recording device according to the embodiment is an optical disc recording device for forming image information on the recording surface of a disc-shaped recording target medium, equipped with the data acquisition unit 106 which acquires bitmap data corresponding to the image information; the wobble processing unit 104 which acquires, by wobble synchronization, from the optical disc 201 that is the recording target medium and in which information recording tracks have wobbles, address information that is set in the wobbles; the recording position determining unit 107 which determines recording positions where to record the bitmap data on the optical disc 201 using the address information; and the laser drive unit 108 which forms recording marks corresponding to the bitmap data on tracks of the optical disc 201 by applying a light beam having recording power to the recording positions on the optical disc 201.

With the above configuration, by determining recording positions using address information of tracks, recording marks corresponding to bitmap data representing image information can be formed with positional accuracy of the tracks on the optical disc 201 and the address information.

Thus, highly accurate image information can be formed on the recording surface of the optical disc 201.

In the optical disc recording device, the recording processing unit 107 determines, as the recording positions where to record the bitmap data, mark forming positions where to form the recording marks. With this measure, recording marks corresponding to bitmap data representing image information can be formed with positional accuracy of the recording marks that are used for recording on and reproduction from the optical disc 201. More specifically, highly accurate bitmap data can be recorded on the optical disc 201 with the accuracy of the track pitch in the radial direction and the accuracy of the physical length of one channel bit and a shortest length (2T) of the recording marks in the circumferential direction. Thus, highly accurate image information can be formed on the recording surface of the optical disc 201.

In the optical disc recording device, the recording processing unit 107 determines the mark forming positions so that circumferential positions of mark forming positions are the same in a prescribed range in the radial direction of the optical disc 201. With this measure, image information that can be read optically, such as characters, a photograph, or a pattern, can be formed on the recording surface of the optical disc 201.

In the optical disc recording device, the recording processing unit 107 determines each of the mark forming positions in units of a cluster address and a channel bit using a cluster address on the optical disc 201 and the number of channel bits in the cluster. With this measure, highly accurate image information can be formed because recording marks can be formed by determining recording positions in units of a cluster address and a channel bit on the optical disc 201.

In the optical disc recording device, the recording processing unit 107 sets an image information recording area 252 where to form the image information on the optical disc 201 and calculates the recording positions in the image information recording area 252. With this measure, recording marks corresponding to bitmap data representing image information can be formed by setting an image information recording area 252, for example, every time image information is formed.

In the optical disc recording device, the recording processing unit 107 calculates the recording positions in an image information recording area 252 that is set on the optical disc 201. With this measure, recording marks corresponding to bitmap data representing image information can be formed by setting an image information recording area 252 in advance at the time of, for example, formatting of the optical disc 201.

In the optical disc recording device, the image information is black-and-white binary information or grayscale information including at least one of a set of characters, a symbol, a picture, a photograph, a figure, a pattern, a two-dimensional code, a barcode, and a watermark figure. With this measure, various kinds of black-and-white binary information or grayscale image information can be formed as the image information with high accuracy. For example, characters, a symbol, a picture, a photograph, a figure, a pattern, or the like can be recognized by human naked eyes or read by an optical reading device.

The image information formed on the optical disc 201 makes it possible to easily check information (content, title, data type, person who generated it, date and time of generation, etc.) relating to recording data that was recorded as user data. It also becomes possible to read, with an optical reading device, a pattern, a two-dimensional code (e.g., QR code (registered trademark)), a barcode, and a watermark figure, or the like. Furthermore, it becomes possible to, for example, identify or make a genuine/false judgment on an individual optical disc 201 or an individual lump of recording data by giving copyright information, serial information, or the like to a two-dimensional code, a watermark figure, or the like.

The optical disc recording method according to the embodiment is an optical disc recording method for forming image information on the recording surface of a disc-shaped recording target medium by an optical disc recording device, including the steps of acquiring bitmap data corresponding to the image information by the data acquisition unit 106; acquiring, by wobble synchronization, from the optical disc 201 that is the recording target medium and in which information recording tracks have wobbles, address information that is set in the wobbles by the wobble processing unit 104; determining recording positions where to record the bitmap data on the optical disc 201 using the address information by the recording processing unit 107; and forming recording marks corresponding to the bitmap data on tracks of the optical disc 201 by applying a light beam having recording power to the recording positions on the optical disc 201 by the laser drive unit 108.

Although the embodiment has been described above with reference to the drawings, it goes without saying that the present disclosure is not limited to the embodiment. It is apparent that those skilled in the art would be able to conceive various changes and modifications within the confines of the claims. And such changes or modifications should naturally be construed as being included in the technical scope of the present disclosure.

The optical disc recording device and the optical disc recording method according to the disclosure are useful for the purpose of forming highly accurate image information.

What is claimed is:

1. An optical disc recording device for forming image information on a recording surface of a disc-shaped recording target medium, comprising:
   a data acquisition unit configured to acquire bitmap data corresponding to the image information;
   an address information acquisition unit configured to acquire, by wobble synchronization, from an optical disc that is the recording target medium and in which an information recording track has wobbles, address information set in the wobbles;
   a recording position determining unit configured to determine a recording position on the optical disc for recording the bitmap data using the address information; and
   a mark recording unit configured to form a recording mark corresponding to the bitmap data on the information recording track of the optical disc by applying a light beam having recording power to the recording position on the optical disc.

2. The optical disc recording device according to claim 1, wherein the recording position determining unit is configured to determine, as the recording position, a mark forming position for forming the recording mark.

3. The optical disc recording device according to claim 2, wherein the recording position determining unit is configured to determine the mark forming position so that positions of a plurality of recording marks are arranged in a radial direction of the optical disc within a prescribed range of the optical disc.

4. The optical disc recording device according to claim 2, wherein the recording position determining unit is configured to determine the mark forming position in units of a cluster address and a channel bit based on the cluster address on the optical disc and the number of channel bits in the cluster.

5. The optical disc recording device according to claim 1, wherein the recording position determining unit is configured to set an image information recording area for forming the image information on the optical disc and to calculate the recording position in the image information recording area.

6. The optical disc recording device according to claim 1, wherein the recording position determining unit is configured to calculate the recording position in an image information recording area that is set on the optical disc.

7. The optical disc recording device according to claim 1, wherein the image information is binary information indicating contrasting density or grayscale information including at least one of a set of characters, a symbol, a picture, a photograph, a figure, a pattern, a two-dimensional code, a barcode, and a watermark figure.

8. The optical disc recording device according to claim 1, wherein the wobbles have shapes that are formed using Saw-Tooth Wobbles so as to be superimposed on Minimum Shift Keying wobbles, and
   wherein the address information acquisition unit is configured to acquire, by the wobble synchronization using the Saw-Tooth Wobbles and the Minimum Shift Keying wobbles, the address information set in the wobbles.

9. An optical disc recording method for forming image information on a recording surface of a disc-shaped recording target medium by an optical disc recording device, the method comprising:
   acquiring bitmap data corresponding to the image information;
   acquiring, by wobble synchronization, from an optical disc that is the recording target medium and in which an information recording track has wobbles, address information that is set in the wobbles;
   determining recording a position on the optical disc for recording the bitmap data using the address information; and
   forming a recording mark corresponding to the bitmap data on the information recording track of the optical disc by applying a light beam having recording power to the recording positions on the optical disc.

10. The optical disc recording method according to claim 9, wherein, in the determining, a mark forming position for forming the recording mark is determined as the recording position.

11. The optical disc recording method according to claim 10, wherein, in the determining, the mark forming position is determined in units of a cluster address and a channel bit is determined based on the cluster address on the optical disc and the number of channel bits in the cluster.

12. The optical disc recording method according to claim 9, wherein the wobbles have shapes that are formed using Saw-Tooth Wobbles so as to be superimposed on Minimum Shift Keying wobbles, and
   wherein, in the acquiring, by wobble synchronization, the address information set in the wobbles is acquired using the Saw-Tooth Wobbles and the Minimum Shift Keying wobbles.

* * * * *